United States Patent [19]

Schvester et al.

[11] Patent Number: 5,029,463
[45] Date of Patent: Jul. 9, 1991

[54] LEAK DETECTION DEVICE FOR IN-LINE MEASUREMENT OF PACKAGE INTEGRITY

[75] Inventors: Pascal Schvester; Natalie Savich, both of Chicago, Ill.

[73] Assignee: American Air Liquide, New York, N.Y.

[21] Appl. No.: 581,191

[22] Filed: Sep. 11, 1990

Related U.S. Application Data

[63] Continuation-in-part of Ser. No. 486,870, Mar. 1, 1990, abandoned.

[51] Int. Cl.⁵ .............................................. G01M 3/20
[52] U.S. Cl. ................................. 73/40.700; 73/45.400
[58] Field of Search ................. 73/40.7, 49.3, 52, 45.4

[56] References Cited

U.S. PATENT DOCUMENTS

| | | | |
|---|---|---|---|
| 3,027,753 | 4/1972 | Harder, Jr. ............................ | 73/40.7 |
| 3,091,114 | 5/1963 | Webster ............................... | 73/40.7 X |
| 3,591,944 | 7/1971 | Wilcox ................................. | 73/49.3 X |
| 3,744,210 | 7/1973 | O'Lenick et al. .................... | 73/40.7 X |
| 3,837,228 | 9/1974 | Nemeth et al. ...................... | 73/40.7 |
| 3,888,111 | 6/1975 | Craig ................................... | 73/40.7 |
| 4,158,960 | 6/1979 | White et al. ......................... | 73/40.7 |

FOREIGN PATENT DOCUMENTS

| | | | |
|---|---|---|---|
| 0165342 | 12/1985 | European Pat. Off. ............. | 73/40.7 |
| 79635 | 3/1989 | Japan .................................... | 73/40.7 |

*Primary Examiner*—Hezron E. Williams
*Assistant Examiner*—Joseph W. Roskos
*Attorney, Agent, or Firm*—Oblon, Spivak, McClelland, Maier & Neustadt

[57] ABSTRACT

A leak detecting device for a package having a plastic cover. Before sealing the cover, a gas containing five percent helium is introduced into the package. The package is placed beneath a hood which has an aspiration device to move the air within the hood through a pipe. A helium sensor is placed within the pipe to detect helium which leaks from the package. The hood also carries a plate which is spring mounted and which comes into contact with the package lid as the hood is lowered over the package. This causes additional pressure within the package so as to accelerate the detection of any leak.

9 Claims, 2 Drawing Sheets

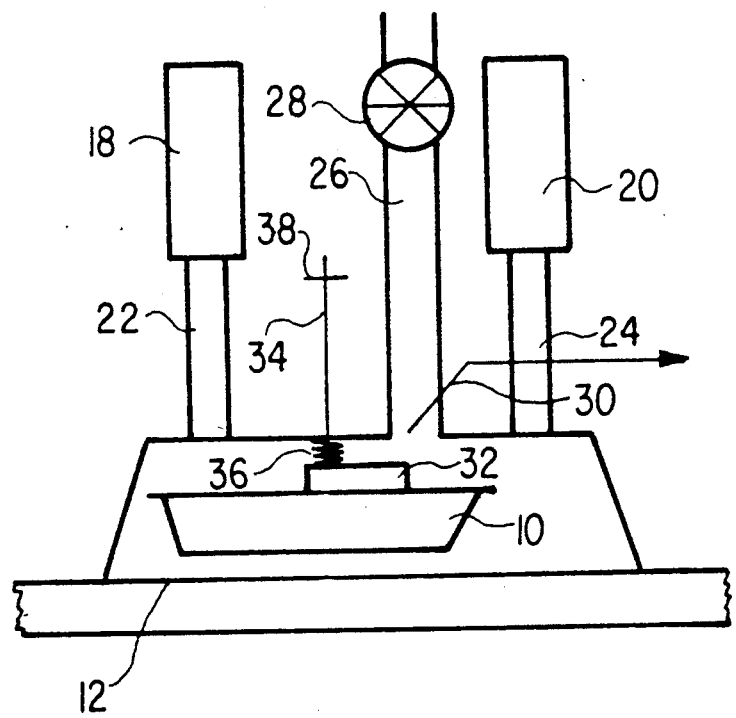

LEAK DETECTION DEVICE FOR IN-LINE MEASUREMENT OF PACKAGE INTEGRITY

This application is a Continuation-In-Part of application Ser. No. 07/486,870, filed on Mar. 1, 1990, now abandoned.

BACKGROUND OF THE INVENTION

1. Field of the Invention

The present invention relates to leak detection devices for packages and more particularly to leak detection devices utilizing helium detectors.

2. Discussion of the Background

Flexible packaging material such as that made of polymer or polymer derivatives has been widely used for packaging in many industries and especially the food industry. These materials can be manufactured in any size and shape and accordingly are advantageous to package manufacturing. However, some problems also occur due to the use of these materials. Since they are light and flexible, they are less resistant to puncturing, slicing and other problems than conventional metallic or glass material.

In one standard packaging process, the final sealing step is achieved by fusing similar materials which are used on both the lid and container. This creates a very safe seal which is nearly impossible to break. However, this creates problems for the consumer since there is great difficulty in opening such packages. In order to avoid marketing problems, seals have been made which are easier to open but which therefore have a greater chance of being unsealed. Problems in the defective seals may be due to wrinkles in the packaging, improper temperatures, contamination of the seal with extraneous material, absence of adhesive and variability of the sealant thickness.

Because of these reasons, the flexible packaging process is not completely reliable. In those packages which include a vacuum, seal defects allow air into the container. In those packages where a modified atmosphere is inserted, the gas contained in the headspace will leak out.

In order to ensure proper packaging, a number of detecting devices have been made so that improperly sealed packages can be rejected. Unfortunately, many of the leaks are too small to be detected by eye and, accordingly, this sophisticated equipment must be utilized.

One type of device shown in U.S. Pat. No. 4,747,299 includes a method of testing a seal by changing the external pressure around the seal. The change in position of the distended container wall in response to the pressure is then sensed.

Another device shown in U.S. Pat. No. 4,683,745 shows the application of a vacuum to a package with the measurement of the vacuum thereafter to determine if air has leaked into the vacuum from the container.

Another device shown in U.S. Pat. No. 4,205,551 includes a needle which is inserted into the package to apply pressure thereto. A sensor in the needle then determines if the pressure decreases.

Another device shown in U.S Pat. No. 4,715,215 includes a vacuum container for receiving the package. As the pressure is reduced, the package expands. If the size of the package decreases over time, a leak is indicated.

Other devices place a container under water in order to visually check for bubbles which escape from the container indicating a leak.

All of these testing devices are somewhat reliable but create problems in that they are too slow for inline testing and often require expensive equipment for varying the pressure around the container. In addition, trays having stiff bottoms and soft tops are not easily tested due to their construction. It is also difficult to detect leaks on the bottom of packages since they sit on a hard surface.

In other industries, leak detectors using gasses which can easily be sensed such as helium or carbon dioxide have been used. Helium, for example, has been used in a number of situations to detect very fine leaks in a process where fluids are carried or stored in pipes or vessels. Since helium is an inert gas, it can be used safely in conjunction with many materials. Also, helium sensors have a sensitivity which can detect the presence of helium at lower than $10^{-10}$ cc/second.

SUMMARY OF THE INVENTION

Accordingly, one object of the present invention is to provide a novel method and apparatus for accurately detecting leaks in gas-tight packages.

Another object of the present invention is to provide a novel method and apparatus for detecting leaks in packages which operates at the same speed as the packaging line.

A further object of the present invention is to provide a novel method and apparatus for detecting leaks in packages utilizing a helium sensor.

A still further object of the present invention is to provide a novel method and apparatus for inexpensively and easily testing packages for leaks utilizing a helium detector which operates at a speed compatible with the remainder of the packaging line.

Another object of this invention is provide a novel method and apparatus for detecting leaks in trays having stiff bottoms.

A further object of this invention is to provide a novel method and apparatus for detecting leaks in the bottom surface of packages.

A still further object of this invention is to provide a novel method and apparatus for detecting leaks without sealing the package in a closed environment.

These and other objects of the present invention are achieved by introducing helium gas into the container to be tested before the package is sealed. After sealing, the package is placed under a hood and subjected to pressure from a spring loaded plate. As the air is aspirated or drafted from the hood, a helium sensor determines the presence of helium within the aspirated or drafted air. If helium is present, a leak is indicated and the package is considered defective and removed from the conveyor. The package may be placed on a mesh belt for testing in order to detect leaks from the bottom of the package.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a schematic diagram showing the hood of FIG. 1 in the down position for testing.

DESCRIPTION OF THE PREFERRED EMBODIMENT

Figure 1:
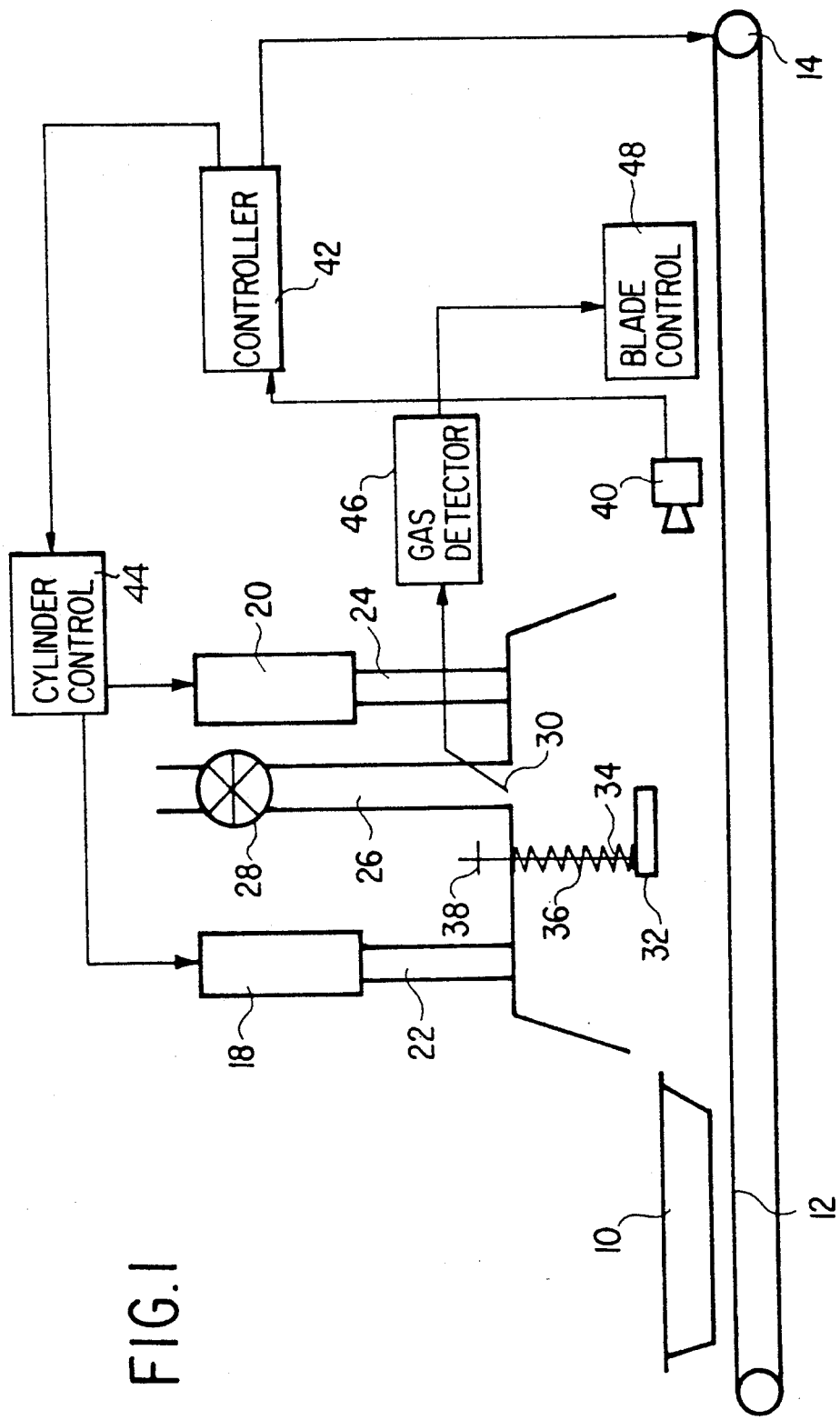
FIG. 1 is a schematic diagram showing the apparatus of the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 shows a package 10 carried on conveyor 12. The package may be a tray having a stiff bottom and sides with a soft top or may be a soft bag. The conveyor may be solid or made of a mesh material. The conveyor is driven by motor 14 at one end of the conveyor.

A hood 16 is mounted above the conveyor by means of cylinders 18 and 20 and pistons 22 and 24. The hood may be raised or lowered according to the action of the cylinders. The cylinders may be hydraulic or pneumatic cylinders or may be the electrical equivalent. A pipe 26 is connected to the hood for moving air therefrom. An aspiration turbine 28 causes air to move from within the hood and through the pipe. A helium sensor 30 is placed in the mouth of the pipe 26 and senses the air moving from the hood into the pipe. A tube then carries the air which is sensed to the gas detector 46 to determine if helium is present.

The hood carries a plate 32 which is designed to press against the lid of the package during the testing operation. The surface of the plate may be flat, concave or convex depending on the shape of the package.

The plate is carried by a rod 34 which extends through the top of the hood. A spring assembly 36 is mounted on the rod in order to force the plate toward the package. The rod carries a stop 38 which prevents the rod from falling from the hood when the package is not present. This stop may be adjusted to control the distance of the plate from the top of the hood. Likewise, the spring 36 may be adjusted both as to height and stiffness in order to accommodate different size packages. The plate may be covered with rubber to cover sharp edges which could puncture the package.

A package detector 40 determines when the package is below the hood in a testing position. When it reaches this position, a signal is sent to controller 42. The controller sends a signal to conveyor motor 14 to stop the movement of the conveyor. At the same time, a signal is sent to cylinder control 44 to actuate cylinders 18 and 20 and thereby the hood is lowered into position on the conveyor and over the package. When the hood is in position, the aspirator 28 removes the air within the hood. Sensor 30 determines if helium is present in the outflowing air. If helium is present, a signal is sent to gas detector 46. The detector then sends a signal to blade control 48 which actuates a blade (not shown) for removing the package from the conveyor.

It is not necessary to have an airtight seal between the belt and hood. All that is needed is the movement of air so that any leaking helium is carried to the sensor. If air leaks in, this will not prevent detection. In fact, if the belt is made of mesh material, it is easier to detect leaks in the bottom of the package since the tracer gas can escape from the package more easily and still be drawn up to the sensor.

FIG. 2 shows part of the apparatus described in FIG. 1. In this case, however, the hood is in the lowered position over the package. The pistons 22 and 24 are extended in order to lower the hood all the way to the conveyor 12. The plate 32 is in contact with the top of the package and applies a force thereto due to the compression of spring 36.

In operation, the package 10 is sealed at a previous step after helium gas is introduced within the container. The amount of helium is preferably about 5 percent by volume although other percentages are possible.

The package is then carried by conveyor 12 until it reaches a position under hood 16. The position detector 40 determines when the package is in the proper position and sends a signal to controller 42. Controller 42 stops the conveyor motor 14 to prevent the package from moving any further. At the same time, a signal is sent to cylinder control 44 so that the cylinders are actuated to lower the hood over the package. As the hood is lowered, the plate 32 comes into contact with the top of the package. This forces the rod 34 upwardly against the compression of spring 36. Since spring 36 resists this movement, pressure is brought to bear on the top of the package by plate 32. After the hood has reached the position shown in FIG. 2, the aspiration turbine is turned on to create an ascending gas flow pattern inside the hood. As the air is removed, helium sensor 30 determines whether helium is present in the removed gas. Since the plate 32 pushes against the package with a certain amount of force, the pressure inside the package is increased, thus causing any leak to be more prominent. If helium is detected, a signal is sent to gas detector 46 which then actuates the blade control to remove the package from the conveyor.

After a predetermined amount of time, which is determined by a timer in controller 42, the test is considered to be completed and the hood is then raised again. The conveyor is then started again and the package continues along the conveyor belt.

EXAMPLE 1

A hood having a volume of 4.2 liters is connected to an aspirating blower having a flow rate of 16 standard liters per minute. The helium gas sensor is connected to a helium leak detector by way of a 45 centimeter flexible tube. Flexible bags made of a gas barrier polymeric material were used as sample packages for the test. The bags were filled with either carbon dioxide or nitrogen mixed with 5 percent helium gas. The total volume of the bags is between 250 and 450 cc. Before introducing the bags to the hood, the bags were perforated by a 0.5 mm diameter pin at various locations. The helium reference concentration in the hood varies between 2 and $3 \times 10^{-8}$ atm cc/second. A non-perforated bag introduced into the hood is pressed by the plate. The detected level remains between 2 and $3 \times 10^{-8}$ atm cc/second during the testing time of 30 seconds. The nonperforated bag is then replaced with a perforated bag. The gas level rises to $2-9 \times 10^{-7}$ atm cc/second, 0.2 seconds after the plate has come into contact with the bag. After removing the perforated bag, the detected level decreases immediately and stabilizes to its initial value. Similar results occur with the perforation placed in different positions on the bag with the response time varying up to 0.6 seconds. The tracer gas can have a partial pressure 1 to 100%. Preferably, a concentration of one percent to five percent volume of tracer gas is used according to the present invention. It should also be understood that gases other than helium, which are easily detectable, such as $CO_2$, $N_2O$, $CH_4$, etc. can be used. The package may also include additional gas or gas mixtures which are used to preserve food products or other products contained therein. Such gases may be $N_2$, $CO_2$, $CO$, $O_2$, $N_2O$, $Ar$, etc. If a product contained in the package does not need a preserving gas, it may be desirable merely to have other kinds of gases for other purposes such as an inert gas merely to support the package.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for detecting a leak in a tray containing a detectable tracer gas, comprising:
    a hood having a larger volume than said tray for receiving said package there within;
    means for applying pressure to a surface of said tray, said means being mounted on said hood, including a plate means for contacting said surface, resilient means which is compressed between said hood and said plate means causing pressure to be applied to said tray and stop means which adjustably limits the movement of the plate means towards said tray;
    an aspiration device for generating an air draft within said hood; and
    a gas detector for determining when said tracer gas is present from the drafted air.

2. The apparatus according to claim 1, wherein said tracer gas is helium.

3. The apparatus according to claim 1, wherein the plate is adjustable to fit different sized packages.

4. The apparatus according to claim 1, wherein the plate is adjustable to fit different package thicknesses.

5. The apparatus according to claim 1, wherein said air is drafted by an aspiration device within an exhaust pipe and said sensor is located in said exhaust pipe near said hood.

6. The apparatus according to claim 1, further comprising a conveyor for carrying said package into position below said hood;
    means responsive to said sensor for determining that a package is defective; and
    means for removing said package from said conveyor.

7. The apparatus according to claim 6, further comprising means for sensing the presence of the package below said hood, for stopping said conveyor and for controlling the lowering of said hood.

8. The apparatus according to claim 7, further comprising at least one piston and cylinder unit for lowering said hood.

9. An apparatus for detecting a leak in a package containing a detectable tracer gas, comprising:
    a hood having a larger volume than said package for receiving said package there within;
    means for applying pressure to a surface of said package, said means being mounted on said hood, including a plate means for contacting said surface, resilient means which is compressed between said hood and said plate means causing pressure to be applied to said tray and stop means which adjustably limits the movement of the plate means towards said package;
    an aspiration device for generating an air draft within said hood;
    a gas detector for determining when said tracer gas is present from the drafted air; and
    a conveyor made of mesh material for carrying said package into position below said hood.

* * * * *